United States Patent [19]

Ritterman et al.

[11] 4,275,127

[45] Jun. 23, 1981

[54] SEALED NICKEL-CADMIUM BATTERY WITH SELF-REGULATING PRECHARGE ADJUSTMENT CAPABILITY

[75] Inventors: Paul F. Ritterman, Granada Hills; Richard H. Sparks, Westminster, both of Calif.

[73] Assignee: TRW Inc., Redondo Beach, Calif.

[21] Appl. No.: 50,046

[22] Filed: Jun. 19, 1979

[51] Int. Cl.³ ............................................ H01M 10/34
[52] U.S. Cl. ....................................... 429/50; 429/57; 429/60
[58] Field of Search .................... 429/57–60, 429/50, 222, 223, 27

[56] References Cited

U.S. PATENT DOCUMENTS

| | | | |
|---|---|---|---|
| 3,850,694 | 11/1974 | Dunlop et al. | 429/21 |
| 3,939,006 | 2/1976 | Kozawa | 429/57 |
| 3,980,501 | 9/1976 | Feder et al. | 429/60 |
| 4,142,025 | 2/1979 | Ritterman | 429/60 |

FOREIGN PATENT DOCUMENTS 2527173  1/1976  Fed. Rep. of Germany.

Primary Examiner—Anthony Skapars
Attorney, Agent, or Firm—John J. Connors; Donald R. Nyhagen

[57] ABSTRACT

The negative precharge of a sealed nickel-cadmium battery cell is reduced and the uncharged negative capacity is correspondingly increased to increase the overcharge protection of the cell by overdischarging the cell at a relatively high rate and reacting hydrogen evolved in the cell during such overdischarge with a hydrogen getter which forms a hydride with the hydrogen to prevent excessive hydrogen pressure buildup in the cell.

6 Claims, 5 Drawing Figures

A
UNCHARGED
NEGATIVE
CAPACITY
(OVERCHARGE
PROTECTION)

Cd(OH)$_2$

100% CHARGED $\dfrac{Cd}{Cd(OH)_2}$ $\dfrac{NiOOH}{Ni)OH)_2}$

100% CHARGED

B
NEGATIVE
PRECHARGE

Cd

SEALED NICKEL-CADMIUM BATTERY WITH SELF-REGULATING PRECHARGE ADJUSTMENT CAPABILITY

BACKGROUND OF THE INVENTION

Nickel-cadmium batteries are widely used for a variety of electrical power storage applications, notably electrical power storage in spacecraft. The basic arrangement, construction, and chemistry of such batteries are well-known and hence need not be elaborated on in this disclosure. It should be noted at the outset, however, that this invention is useful on both hermetically sealed cells and sealed cells equipped with high pressure relief vents. Accordingly, as the expression is used in this disclosure, "sealed nickel-cadmium cells" is intended to encompass both hermetically sealed cells and sealed cells with a high pressure relief vent.

Suffice it to say that sealed nickel-cadmium batteries of the kind used for spacecraft energy storage, while having many desirable features and advantages for this type of service, have a characteristic which detracts from their usefulness, particularly for future satellite and other future spacecraft applications. This characteristic is the tendency for the precharge of the negative electrode of a sealed nickel-cadmium battery cell to gradually increase with charge-discharge cycling of the cell due to oxidation of the hydrolysis products of the nonwoven nylon cell separators. Thus, it has been shown that these separators are hydrolyzed by the potassium hydroxide electrolyte in the cell, and the byproducts of this hydrolysis process are oxidized by the positive electrode. This then results in an increased amount of charge input during an ensuing charge required to reach oxygen gassing from the positive electrode. This results in reduction of uncharged negative electrode active material, and hence growth of negative electrode precharge due to the additional charge required to fully recharge the positive electrode. Continued growth of the negative electrode precharge would result in loss of overcharge protection owing to complete depletion of electrochemically active uncharged negative electrode material when the sealed nickel-cadmium cell is fully charged. Loss of overcharge protection, in turn, could result in catastrophic cell failure due to hydrogen pressure buildup during overcharging of the cell and in high charge voltages which prevent normal recharging. Since spacecraft charge control usually results in termination or reduction of charge at a predetermined voltage limit, the hydrogen evolution and high voltage are usually eliminated. However, due to loss of overcharge protection, the high voltage is reached at a lower state of charge, and the battery fails due to incomplete charging.

Up to the present time, this characteristic of nickel-cadmium battery cells has not presented too serious a problem because of the relatively short design service lives of past and current satellites and other spacecraft in which nickel-cadmium batteries were used. Present geosynchronous orbital satellite systems, for example, are designed to operate for five to ten years. In contrast, future systems are planned for 12 years of service and beyond. The growth of negative electrode precharge caused by battery cycling over the shorter service lives of the past and current satellite systems was generally not a serious problem, or at least a problem which could not be resolved or avoided by state of the art solutions. Over the substantially longer lifetimes of future satellite systems, however, negative electrode precharge growth will be a problem which must be resolved in an effective manner in order to conform nickel-cadmium battery service life to the extended service lives of future satellite systems and the like.

Various techniques have been devised, of course, for increasing the service life of nickel-cadmium batteries in general and, more specifically, for increasing uncharged negative electrode capacity. For example, it is known that uncharged negative electrode capacity may be induced into a cell to reduce the negative electrode precharge by overdischarge of the cell. Such overdischarge, however, results in hydrogen evolution from the positive electrode, and this hydrogen reacts, though slowly, with the uncharged negative electrode to chemically recharge the electrode. Accordingly, if the electrode is overdischarged at a relatively low rate, the electrode precharge reducing action of the overdischarge and the electrode recharging action of the evolved hydrogen counteract one another, and no net increase is uncharged negative electrode capacity is achieved. On the other hand, if the overdischarge is performed at a high rate, as required to achieve an increase in uncharged negative electrode capacity, catastrophic failure can occur due to excessive hydrogen pressure buildup.

SUMMARY

This invention provides an improved sealed nickel-cadmium battery cell and high rate cell overdischarging method whereby the cell may be subjected to high rate overdischarge to increase the uncharged negative electrode capacity, without excessive hydrogen pressure buildup in the cell. To this end, the invention incorporates within the cell a hydrogen getter which reacts with hydrogen in the cell at a relatively high rate and at relatively low equilibrium pressures to form a hydride. This getter is contained in the cell in such a way that it is electrically isolated from the electrodes but exposed to hydrogen in the cell.

This nickel-cadmium cell may be overdischarged at a high rate to form uncharged negative electrode capacity without excessive hydrogen pressure buildup. Thus, hydrogen formed during overdischarge to a pressure exceeding the equilibrium pressure for the particular hydrogen getter employed would be rapidly consumed by the getter. One gram of LaNi$_5$, for example, consumes 0.4-Ah equivalent H$_2$. A nickel-cadmium cell overdischarged by 8-Ah produces 8-Ah of discharged negative capacity and 8-Ah of equivalent hydrogen. With only 20 grams of LaNi$_5$ incorporated into the cell (about 3% the total weight of a 20-Ah cell) this state of charge adjustment may be induced without increasing the cell hydrogen pressure above 30 psia. In contrast, in the absence of the hydrogen getter, an overdischarge of 8-Ah would produce a pressure of 1000 psia in the cell and very likely cause catastrophic failure of the cell.

DESCRIPTION OF THE PREFERRED EMBODIMENTS

Figure 1:
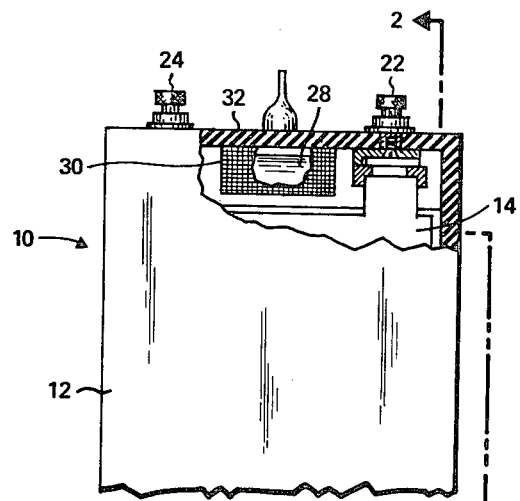
FIG. 1 is a side elevation, partly in section, of a sealed nickel-cadmium battery cell according to the invention.
Figure 2:
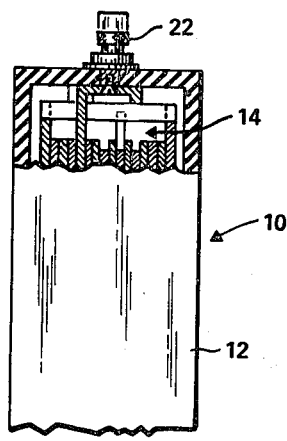
FIG. 2 is a section taken on line 2—2 in FIG. 1.
Figure 3:
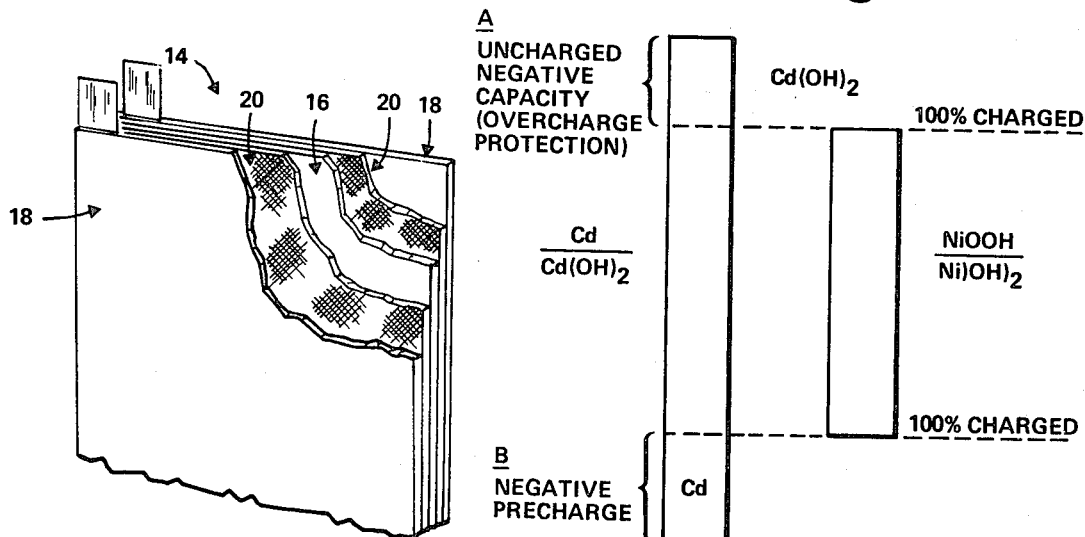
FIG. 3 is a perspective view, partly broken away, of a portion of one nickel-cadmium electrode stack of the cell.

The improved sealed nickel-cadmium battery cell 10 of the invention illustrated in the drawings is essentially conventional except for its incorporation of a hydrogen getter in accordance with this invention. Accordingly, it is unnecessary to describe the basic cell construction in elaborate detail.

Suffice it to say that the cell 10 has a hermetically sealed casing 12 constructed of steel or other suitable material. Contained within the casing is an electrode stack 14. This electrode stack includes positive and negative electrodes 16, 18 and separators 20 between the adjacent positive and negative electrodes. The separators 20 comprise mats of a suitable dielectric material, such as nonwoven nylon, which is porous to the cell electrolyte. Cell electrodes 16, 18 are electrically connected to the positive and negative cell terminals 22, 24 in the usual way.

The chemistry of the nickel-cadmium battery cell 10, as thus far described, is also conventional and well understood and hence need not be explained in elaborate detail. Suffice it to say that during its service life, a nickel-cadmium battery cell on board an orbiting satellite is subjected to numerous charge-discharge cycles. These cycles occur in accordance with the following equations:

At the positive electrode:

$$2\text{ NiOOH} + 2\text{ H}_2\text{O} + 2\bar{e} \underset{\text{charge}}{\overset{\text{discharge}}{\rightleftarrows}} 2\text{ Ni(OH)}_2 + 2\text{O}\overline{\text{H}} \quad (1)$$

At the negative electrode:

$$\text{Cd} + 2\text{O}\overline{\text{H}} \underset{\text{charge}}{\overset{\text{discharge}}{\rightleftarrows}} \text{Cd(OH)}_2 + 2\bar{e} \quad (2)$$

The total cell reaction:

$$\text{NiOOH} + \text{Cd} + 2\text{ H}_2\text{O} \underset{\text{charge}}{\overset{\text{discharge}}{\rightleftarrows}} 2\text{ Ni(OH)}_2 + \text{Cd(OH)}_2 \quad (3)$$

During overdischarge with excess Cd capacity, reaction (2) above occurs at the negative electrode and the following reaction occurs at the positive electrode:

$$2\text{ H}_2\text{O} + 2\bar{e} \xrightarrow{\text{over discharge}} 2\text{ O}\overline{\text{H}} + \text{H}_2$$

Figure 4:
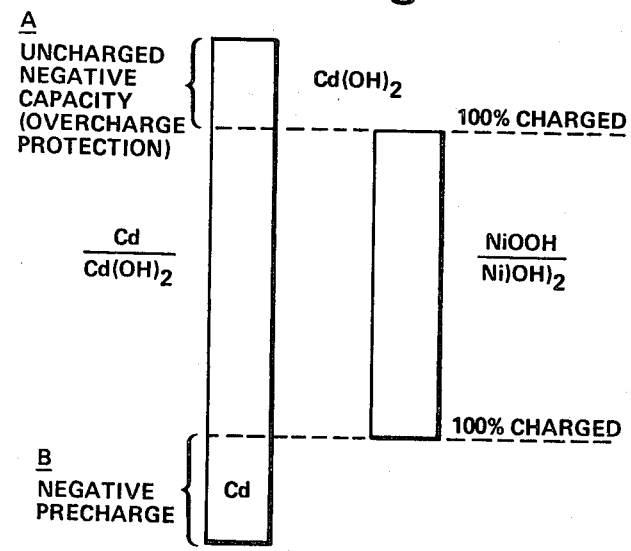
FIG. 4 depicts the relative charge capacities and electrochemical balance of the electrodes of a conventional nickel-cadmium cell.
Figure 5:
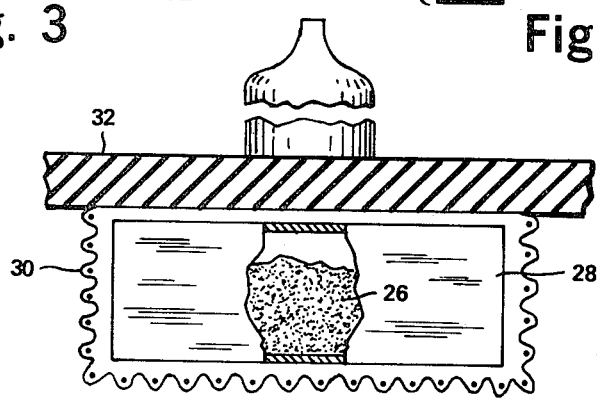
FIG. 5 is an enlarged detail illustrating the hydrogen getter contained in the cell.

As depicted graphically in FIG. 4, the electrodes of a positive limiting sealed nickel-cadmium battery cell are provided with relative electrical capacities and an electrochemical balance such that under normal conditions the negative electrode is not fully charged during full charging of the positive electrode nor fully discharged during full discharging of the positive electrode. The uncharged electrochemically active material remaining in the negative electrode when the positive electrode is fully charged is designated A in FIG. 4 and provides the cell with overcharge protection. In the absence of such overcharge protection, overcharging the cell would result in high voltage and the evolution of hydrogen and a resultant increase in the internal cell pressure which could cause catastrophic failure of the cell. The charged electrochemically active material remaining in the negative electrode when the positive electrode is fully discharged is designated B in FIG. 4 and constitutes the precharge of the negative electrode. This precharge is provided because the capacity of the negative electrode tends to degrade slightly with cycling while the positive capacity tends to remain constant or increase slightly.

It has been found that continued cycling; i.e., charging and discharging, a sealed nickel-cadmium battery cell gradually increases the negative electrode precharge B and, as a consequence, gradually reduces the uncharged electrochemically active material A in the electrode. The overcharge protection provided by the negative electrode is thereby also reduced. Studies made by Hong Sup Lim et al. and reported at pages 83–85 of the Proceedings of the Twenty-seventh Power Sources Symposium (Published by PSC Publications Committee, P.O. Box 891, Red Bank, N.J. 07701), demonstrated that this growth of the negative electrode precharge probably results from hydrolysis of the electrode separators (items 20) which are commonly constructed of nonwoven nylon felt, oxidation of the resulting hydrolysis products, and reduction of Cd(OH)$_2$ in the negative electrode to compensate for such oxidation. Thus, hydrolysis of the separators and oxidation of the hydrolysis products probably occurs according to the following equation:

$$[-\text{NH}(\text{CH}_2)_5\text{CO}-] + 45\text{OH}^- = 6\text{CO}_3^{--} + \tfrac{1}{2}\text{N}_2 + 28\text{H}_2\text{O} + 33e^- \quad (5)$$

Reduction of Cd(OH)$_2$ in the negative electrode to compensate for the oxidation probably occurs according to the following equation:

$$16\tfrac{1}{2}\text{Cd(OH)}_2 + 33e^- = 16\tfrac{1}{2}\text{Cd} + 33\text{OH}^- \quad (6)$$

$$[-\text{NH}(\text{CH}_2)_5\text{CO}-] + 16\tfrac{1}{2}\text{Cd(OH)}_2 + 12\text{KOH} = 16\tfrac{1}{2}\text{Cd} + 6\text{K}_2\text{CO}_3 + \tfrac{1}{2}\text{N}_2 + 28\text{H}_2\text{O}$$

The above reduction of Cd(OH)$_2$ in the negative electrode will shift the relative charge balance of the negative and positive electrodes and produce a corresponding reduction in the uncharged negative electrode and cell overcharge protection A and increase in the negative electrode precharge B.

It is known that the negative electrode precharge B of a nickel-cadmium cell may be reduced and the uncharged negative electrode capacity A correspondingly increased by overdischarging the cell. The cell reaction during overdischarge proceeds according to equations (2) and (4) set forth earlier. The hydrogen evolved at the positive electrode in accordance with equation (4) tends to react with the negative electrode in such a way as to recharge the latter. As a consequence, if the cell is overdischarged slowly, the resulting negative electrode recharging action of the hydrogen formed in the cell counteracts the negative electrode precharge reducing action of the overdischarge. Slow overdischarge thus produces no significant reduction in the negative electrode precharge B and hence no significant increase in the uncharged negative electrode capacity or cell overcharge protection A. On the other hand, high rate overdischarge of a sealed cell may result in catastrophic cell failure due to excessive hydrogen pressure buildup in the cell.

This invention avoids these problems associated with negative electrode precharge reduction or adjustment in a sealed nickel-cadmium cell by overdischarge of the cell. According to the invention, this is accomplished by incorporating in the cell 10 a hydrogen getter 26 which reacts at a high rate with the hydrogen formed in the cell during high rate overdischarge of the cell to form a hydride. This hydrogen getter is contained in the cell in such a way that the getter is electrically isolated from the cell electrodes 16, 18 to avoid electrical shorting of the latter by the getter, and is exposed to the cell interior for reaction with hydrogen formed during overdischarge.

The hydrogen getter 26 may be contained in the cell 10 in various ways. As presently contemplated, the getter is contained in a capsule 28 which confines the getter but is porous to the hydrogen in the cell. This capsule may be constructed of the same material as the electrode separators 20. Capsule 28, in turn, is confined within a porous enclosure 30, such as a screen cage, fixed to the upper wall 32 of the cell casing 12.

The hydrogen getter 26 used in the invention is selected from the following group:

| | | |
|---|---|---|
| $LaNi_5$ | $FeTi$ | $Ca_{0.7}MM_{0.3}Ni_5$ |
| $CaNi_5$ | $(Fe_{0.9}Mn_{0.1})$ | $Ca_{0.2}MM_{0.8}Ni_5$ |
| $Ni_5MM_{0.1}Ca_{0.9}$ | $(Fe_{0.8}Ni_{0.2})Ti$ | $CaNi_{4.7}Al_{0.3}$ |
| $Ni_{4.3}Mn_{0.7}MM$ | | $MM\ Ni_{4.5}Al_{0.5}$ |

Where MM is the symbol for mischmetal comprising the following ingredients in the indicated proportions:

| | |
|---|---|
| Ca | 48%–50% |
| La | 32%–34% |
| Nd | 13%–14% |
| Fr | 4%–5% |
| Rare earths | 1.5% |

During high rate overdischarge of the present improved sealed nickel-cadmium cell 10, hydrogen is evolved in the cell in accordance with equation (4). The hydrogen getter 26 reacts rapidly with this hydrogen to form a hydride at hydrogen pressures exceeding the hydrogen equilibrium pressure for the particular getter employed. The rate of this reaction is such that the cell may be overcharged at a high rate sufficient to adjust or reduce the negative electrode precharge B and correspondingly increase the uncharged negative electrode capacity and hence overcharge protection A while the internal cell pressure remains relatively low at the hydrogen equilibrium pressure for the particular getter employed.

In the case of the hydrogen getter $LaNi_5$, for example, the hydrogen getter reaction occurs according to the following equation:

$$LaNi_5 + 3H_2 \rightarrow LaNi_5H_6 \qquad (8)$$

This reaction occurs at hydrogen pressures (equilibrium pressure for the $LaNi_5$ getter) on the order of 1–2 atmospheres. Thus, all hydrogen formed in the cell to a pressure extending this equilibrium pressure is rapidly consumed by the $LaNi_5$ according to equation (8). One gram of $LaNi_5$, for example, consumes 0.4-Ah equivalent of hydrogen. The nickel-cadmium cell, when overdischarged by 8-Ah, would product 8-Ah of discharged negative electrode capacity and 8-Ah equivalent hydrogen. Accordingly, with only 20 grams of $LaNi_5$ contained in the cell, which is about 3% of the total weight of a 20-Ah cell, an 8-Ah negative precharge adjustment (reduction) and an equivalent increase in uncharged negative capacity and overcharge protection can be accomplished with a maximum internal cell hydrogen pressure on the order of 30 psia. In the same cell, in the absence of the hydrogen getter $LaNi_5$, an 8-Ah overdischarge would produce an internal cell hydrogen pressure on the order of 1000 psia.

It is now evident, therefore, that this invention permits negative electrode precharge adjustment (reduction) in a sealed nickel-cadmium battery cell to produce an equivalent adjustment (increase) in the uncharged negative capacity and cell overcharge protection by high rate overdischarge of the cell without producing internal cell hydrogen pressure in excess of the equilibrium pressure for the particular hydrogen getter employed. In this regard, the preferred getters are $LaNi_5$, $CaNi_5$, $Ni_5MM_{0.1}Ca_{0.9}$, and $Ni_{4.3}Mn_{0.7}MM$ because of their relatively low equilibrium pressures.

We claim:

1. In a sealed nickel-cadmium battery cell having a sealed casing containing positive and negative electrodes spaced by intervening porous separators, the improvements comprising:

a hydrogen getter within said cell selected from the group consisting of:

| | | |
|---|---|---|
| $CaNi_5$ | $FeTi$ | $Ca_{0.7}MM_{0.3}Ni_5$ $MM\ Ni_{4.5}Al_{0.5}$ |
| $N_{15}MM_{0.1}Ca_{0.9}$ | $(Fe_{0.9}Mn_{0.1})$ | $Ca_{0.2}MM_{0.8}Ni_5$ |
| $Ni_{4.3}Mn_{0.7}MM$ | $(Fe_{0.8}Ni_{8.2})Ti$ | $CaNi_{4.7}Al_{0.3}$ | containing means comprising a sealed porous capsule containing said getter in the cell in a manner such that the getter is electrically isolated from said electrodes and exposed to the cell interior, whereby said cell may be overdischarged at a relatively high rate to reduce negative precharge and increase uncharged negative capacity in the cell without excessive hydrogen pressure buildup in the cell.

2. The nickel-cadmium cell of claim 1 wherein:
   said hydrogen getter is selected from the group consisting of: $CaNi_5$, $Ni_5MM_{0.1}Ca_{0.9}$, $Ni_{4.3}Mn_{0.7}MM$.

3. The nickel-cadmium cell of claim 1 wherein:
   said containing means further comprises a porous enclosure attached to said casing and containing said capsule.

4. The nickel-cadmium cell of claim 3 wherein:
   said hydrogen getter is selected from the group consisting of: $CaNi_5$, $Ni_5MM_{0.1}Ca_{0.9}$, $Ni_{4.3}Mn_{0.7}MM$.

5. The method of reducing negative precharge and increasing uncharged negative capacity in a sealed nickel-cadmium battery cell without excessive hydrogen pressure buildup in the cell, comprising the steps of:
   overdischarging said cell at a relatively high rate, whereby hydrogen is evolved at the positive electrode, and
   reacting said hydrogen with a hydrogen getter electrically isolated from said electrodes and selected from the group consisting of:

| | | |
|---|---|---|
| | FeTi | $Ca_{0.7}MM_{0.3}Ni_5$ |
| $CaNi_5$ | $(Fe_{0.9}Mn_{0.1})$ | $Ca_{0.2}MM_{0.8}Ni_5$ |
| $Ni_5MM_{0.1}Ca_{0.9}$ | $(Fe_{0.8}Ni_{0.2})Ti$ | $CaNi_{4.7}Al_{0.3}$ |

| | |
|---|---|
| $Ni_{4.3}Mn_{0.7}MM$ | $MM\,Ni_{4.5}Al_{0.5}$ |

6. The method of claim 5 wherein:
said hydrogen getter is selected from the group consisting of $CaNi_5$, $Ni_5MM_{0.1}$, $Ca_{0.9}$, $Ni_{4.3}Mn_{0.7}MM$.

* * * * *